United States Patent
Althouse et al.

(10) Patent No.: US 12,028,377 B2
(45) Date of Patent: *Jul. 2, 2024

(54) ACTIVE FINGERPRINTING FOR TRANSPORT LAYER SECURITY (TLS) SERVERS

(71) Applicant: Salesforce, Inc., San Francisco, CA (US)

(72) Inventors: John Brooke Althouse, Round Hill, VA (US); Andrew Smart, Rockville, MD (US); Randy Nunnally, Jr., Ijamsville, MD (US); Michael Brady, Indianapolis, IN (US); Caleb Yu, Reston, VA (US)

(73) Assignee: Salesforce, Inc., San Francisco, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/815,727

(22) Filed: Jul. 28, 2022

(65) Prior Publication Data

US 2022/0368724 A1 Nov. 17, 2022

Related U.S. Application Data

(63) Continuation of application No. 17/125,283, filed on Dec. 17, 2020, now Pat. No. 11,411,997.

(60) Provisional application No. 63/065,265, filed on Aug. 13, 2020.

(51) Int. Cl.
*H04L 9/40* (2022.01)
*H04L 9/06* (2006.01)
*H04L 41/22* (2022.01)

(52) U.S. Cl.
CPC ......... *H04L 63/166* (2013.01); *H04L 9/0643* (2013.01); *H04L 41/22* (2013.01); *H04L 63/1416* (2013.01); *H04L 63/20* (2013.01)

(58) Field of Classification Search
CPC . H04L 63/166; H04L 9/0643; H04L 63/1416; H04L 63/20
USPC ........................................................ 713/181
See application file for complete search history.

(56) References Cited

U.S. PATENT DOCUMENTS

| 10,536,439 | B2 | 1/2020 | Althouse et al. |
| 11,240,270 | B1* | 2/2022 | Griffin ................. H04L 63/168 |
| 2002/0112152 | A1* | 8/2002 | VanHeyningen ... H04L 63/0457 713/151 |

(Continued)

*Primary Examiner* — Teshome Hailu
(74) *Attorney, Agent, or Firm* — Holland & Hart LLP

(57) ABSTRACT

Methods, systems, and devices supporting active fingerprinting for transport layer security (TLS) servers are described. In some systems, a client device may transmit a same set of client hello messages to each TLS server. The client device may receive a set of server hello messages in response to the standard set of client hello messages based on the contents of each client hello message. For example, a server hello message may indicate a selected cipher suite, TLS protocol version, and set of extensions in response to the specific information included in a client hello message. The client device may generate a hash value (e.g., a fuzzy hash) based on the set of server hello messages received from a TLS server. By comparing the hash values generated for different TLS servers, the client device may determine whether the TLS configurations for the different TLS servers are the same or different.

20 Claims, 9 Drawing Sheets

(56) References Cited

U.S. PATENT DOCUMENTS

| | | | | |
|---|---|---|---|---|
| 2004/0210756 | A1* | 10/2004 | Mowers | H04L 63/0869 |
| | | | | 713/168 |
| 2007/0136801 | A1* | 6/2007 | Le | H04L 63/102 |
| | | | | 726/10 |
| 2013/0198509 | A1* | 8/2013 | Buruganahalli | H04L 63/1408 |
| | | | | 713/151 |
| 2014/0093081 | A1* | 4/2014 | Hawkes | H04L 63/062 |
| | | | | 380/270 |
| 2015/0067338 | A1* | 3/2015 | Gero | H04L 63/061 |
| | | | | 713/171 |

* cited by examiner

ACTIVE FINGERPRINTING FOR TRANSPORT LAYER SECURITY (TLS) SERVERS

CROSS REFERENCES

The present application for patent claims priority to U.S. patent application Ser. No. 17/125,283 by Althouse et al., entitled "ACTIVE FINGERPRINTING FOR TRANSPORT LAYER SECURITY (TLS) SERVERS," filed Dec. 17, 2020 and U.S. Provisional Patent Application No. 63/065,265 by Althouse et al., entitled "ACTIVE FINGERPRINTING FOR TRANSPORT LAYER SECURITY (TLS) SERVERS," filed Aug. 13, 2020, each of which is assigned to the assignee hereof and expressly incorporated by reference herein.

FIELD OF TECHNOLOGY

The present disclosure relates generally to database systems and data processing, and more specifically to active fingerprinting for transport layer security (TLS) servers.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, client and server applications may use the transport layer security (TLS) protocol to provide security for communications over the Internet. The TLS protocol may include a number of sub-protocols to allow the client and server applications to determine security parameters, authenticate each other, instantiate negotiated security parameters, report error conditions, or any combination thereof. However, the TLS protocol, including the sub-protocols, may fail to indicate similarities between servers to the client. For example, if the client identifies a server related to malware, the client may not be able to determine whether another server is related to the same malware based on the TLS protocol. This may potentially result in security concerns for the clients.

DETAILED DESCRIPTION

Figure 1:
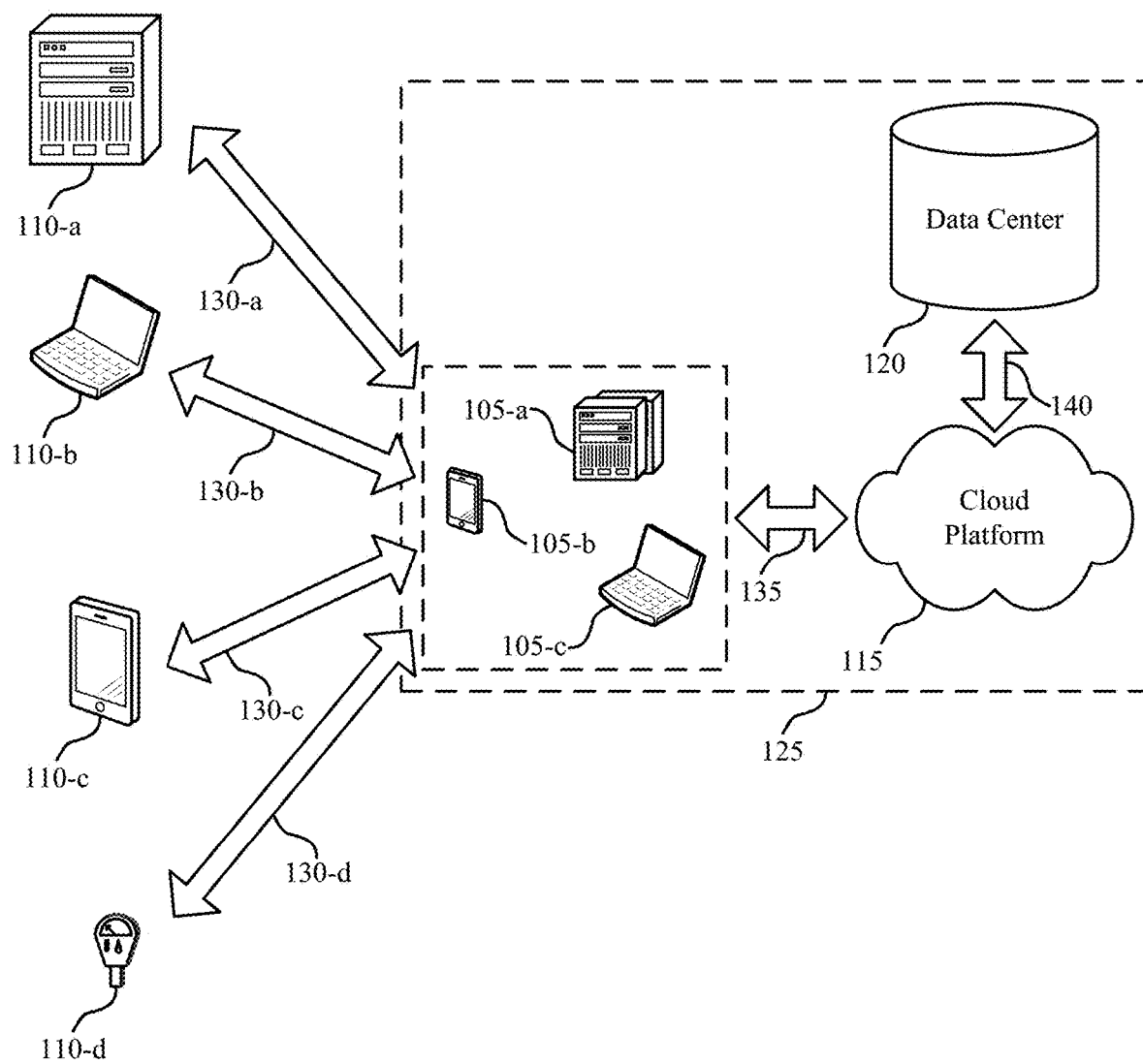
FIG. 1 illustrates an example of a system for cloud computing that supports active fingerprinting for transport layer security (TLS) servers in accordance with aspects of the present disclosure.

In some systems, client and server applications may use the transport layer security (TLS) protocol to provide security for communications over the Internet. The TLS protocol may include a number of sub-protocols to allow the client and server applications to determine security parameters, authenticate each other, instantiate negotiated security parameters, report error conditions, or any combination thereof. One example of a TLS sub-protocol is the handshake protocol. During the handshake protocol, a client device may send a client-side security parameter message (e.g., a client hello message, such as the TLS Client Hello message) to a TLS server indicating a cipher suite list, a TLS protocol version, and a set of extensions. Based on this information, the TLS server may respond with a server-side security parameter message (e.g., a server hello message, such as the TLS Server Hello message) indicating a cipher suite selected from the cipher suite list, a TLS protocol version selected by the TLS server, and a set of extensions selected by the TLS server. In this way, the hello messages (e.g., the client hello message and the server hello message) may support an exchange of security enhancement capabilities between the client and the server.

However, the hello messages may be further leveraged to determine similarities between different TLS servers. For example, a client device may send a set of specific client hello messages (e.g., a control set of client-side security parameter messages) to each TLS server of a set of TLS servers to elicit a set of responses from the TLS servers. The set of responses may indicate information about each server's specific TLS configuration. For example, each server with a same TLS configuration may respond to the same set of client hello messages with a same set of server hello messages (e.g., server-side security parameter messages including the same selections of the cipher suite, the TLS protocol version, and the extensions). However, servers with different TLS configurations may respond to the same set of client hello messages with different sets of server hello messages. In this way, the client device may determine TLS servers with the same or different TLS configurations. Such a determination may support identifying TLS server applications, out-of-date TLS servers, TLS servers with potential security vulnerabilities, a set of TLS servers related to the same malware, or any combination thereof. This process of sending specific traffic (e.g., a standard set of client hello messages) to a system, such as a set of TLS servers, in order to analyze the responses (e.g., the resulting set of server hello messages) to identify information about the system may be referred to as active fingerprinting.

For example, the client device may transmit, to a first TLS server and a second TLS server, a same set of client hello messages. The client device may receive, in response to the set of client hello messages, a first set of server hello messages from the first TLS server and a second set of server hello messages from the second TLS server, each server hello message of the sets of server hello messages indicating a cipher suite selected by the TLS server, a TLS protocol version selected by the TLS server, and a set of extensions selected by the TLS server. For example, in response to each client hello message, the client device may either receive a server hello message, a handshake failure alert, or no response based on the contents of the client hello message and the TLS server configuration. The client device may generate a first hash value corresponding to the first TLS server based on the first set of server hello messages and may generate a second hash value corresponding to the second TLS server based on the second set of server hello messages. In some examples, the client device may generate JARM hashes, which may be examples of fuzzy hashes. For example, a first portion of a JARM hash may indicate the selected cipher suites and TLS protocol versions for the received server hello messages and a second portion of the JARM hash may be an example of a sub-hash (e.g., a truncated SHA256 hash or another hash) created using the extensions indicated by the received server hello messages. By comparing the generated hash values for the different TLS servers, the client device may determine whether a first TLS configuration for the first TLS server is different from a second TLS configuration for the second TLS server.

Aspects of the disclosure are initially described in the context of an environment supporting an on-demand database service. Additional aspects of the disclosure are described with reference to fingerprinting processes and a process flow. Aspects of the disclosure are further illustrated by and described with reference to apparatus diagrams, system diagrams, and flowcharts that relate to active fingerprinting for TLS servers.

FIG. 1 illustrates an example of a system 100 for cloud computing that supports active fingerprinting for TLS servers in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125 or at a combination of these components. In some cases, servers may perform the data processing. The servers may be a cloud client 105 or located at data center 120.

The system 100 may support active fingerprinting techniques for TLS servers. For example, a client device (e.g., a cloud client 105) may send specific messages to a TLS server in order to elicit specific responses from the TLS server that indicate information about the TLS server. The cloud client 105 may use this information to compare TLS configurations for different TLS servers to determine whether specific servers are configured with the same or different TLS configurations. In some examples, the cloud client 105 may transmit a standard set of client hello messages (e.g., client-side security parameter messages) to each TLS server, each client hello message indicating a cipher suite list, a TLS protocol version, and a set of extensions. The TLS server may receive the client hello messages and may determine responses to the client hello messages based on the cipher suite lists, TLS protocol versions, sets of extensions, or a combination thereof. In some examples, the TLS server may send a server hello message (e.g., a server-side security parameter message) in response to a client hello message, the server hello message indicating a cipher suite selected by the TLS server from the cipher suite list, a TLS protocol version selected by the TLS server based on the client's indicated TLS protocol version, a set of extensions selected by the TLS server based on the client's indicated extensions, or some combination thereof. In some other examples, the TLS server may determine not to send a response to the cloud client 105 for a client hello message or to trigger a handshake failure alert based on the client hello message (e.g., based on the contents of the client hello message).

The cloud client 105 may receive the set of server hello messages and create a hash value based on the received server hello messages. The cloud client 105 may use the hash value to compare TLS configurations between different TLS servers. For example, the cloud client 105 may determine that TLS servers with different corresponding hash values may be configured with different TLS configurations, while TLS servers corresponding to the same hash values may be assumed to be configured with the same TLS configurations.

Some other systems may implement passive fingerprinting techniques. For passive fingerprinting, a device may capture traffic to and/or from a system and may analyze the traffic to identify information about the system. Passive fingerprinting may support gaining insights into a client (e.g., by analyzing a client hello message sent by a client) but may fail to gain insights into a server (e.g., TLS server), because the analyzed messages may not support accurate comparisons across TLS servers.

In contrast, the system 100 may implement active fingerprinting techniques. By supporting a set of standardized client hello messages for active fingerprinting, the system 100 may support comparisons across TLS servers. That is, a device (e.g., a cloud client 105) may send a set of client hello messages specifically to analyze the TLS configurations for different servers and run comparisons. These comparisons may allow users, applications, and devices to gain insights into how the TLS configurations for different TLS servers are related. Such insights may be valuable for identifying TLS server applications (e.g., malicious or benign TLS server applications). For example, the system 100 may identify out-of-date TLS servers, TLS servers with potential security vulnerabilities, a set of TLS servers all related to the same malware, or any combination thereof.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
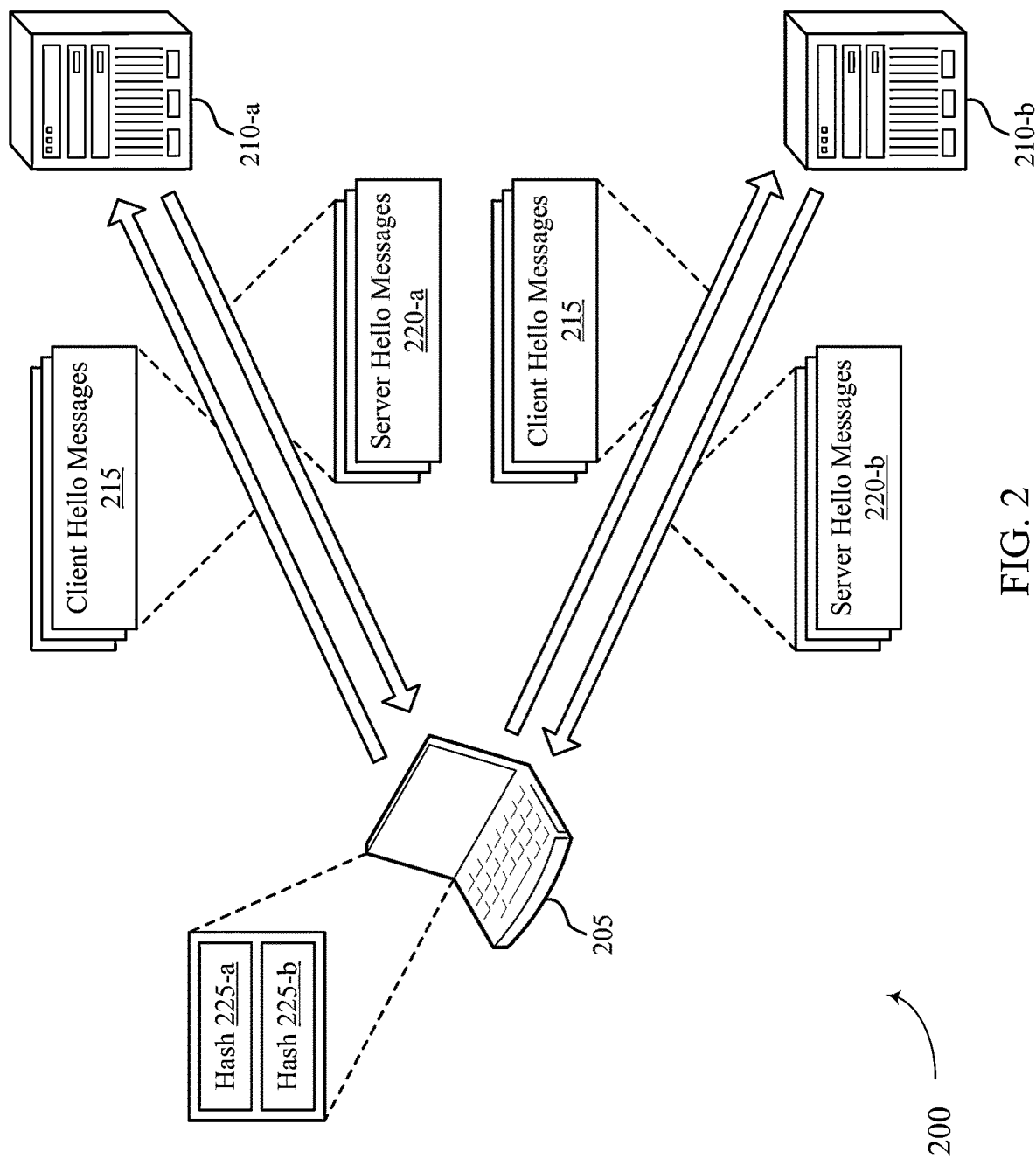
FIGS. 2 and 3 illustrate examples of fingerprinting processes that support active fingerprinting for TLS servers in accordance with aspects of the present disclosure.

FIG. 2 illustrates an example of a fingerprinting process 200 that supports active fingerprinting for TLS servers in accordance with aspects of the present disclosure. The fingerprinting process 200 may be performed by a device 205, which may be an example of a user device, an application, an application server, a database server, a cloud-based server, a server cluster, a virtual machine, a container, or any combination of these or other devices or systems of devices. For example, the device 205 may be an example of a client device running a client application, such as a cloud client 105 as described with reference to FIG. 1. The device 205 may actively fingerprint a number of TLS servers 210 (e.g., servers or server clusters running TLS protocols). Each TLS server 210 may be configured with a TLS configuration. Using the active fingerprinting techniques, the device 205 may determine insights about the TLS configurations of different TLS servers 210.

To support the TLS protocol, a client (e.g., the device 205) and a server (e.g., a TLS server 210) may perform a transmission control protocol (TCP) three-way handshake procedure. The TCP three-way handshake may establish a TCP connection between the client and the server. In a first step of the TCP three-way handshake, the client may transmit a client request message with a synchronize sequence number (SYN) to the server, the SYN indicating the sequence number with which the client will start segments. The server may respond with a SYN and an acknowledgment (ACK). The client may send an ACK back to the server to acknowledge the server's indicated sequence number and to establish the connection between the client and the server.

Upon completion of the TCP three-way handshake, the client (e.g., the device 205) and the server (e.g., a TLS server 210) may negotiate security parameters using hello messages (e.g., security parameter messages). For example, the device 205 may transmit a client hello message (e.g., a client-side security parameter message) to TLS server 210-a indicating a cipher suite list for the client, a TLS protocol version for the client, a set of extensions for the client, or a combination thereof. The client hello message may indicate that TLS is the preferred method of communication for the client. TLS server 210-a may select a cipher or cipher suite from the cipher suite list, a TLS protocol version based on the version indicated by the client, and a set of extensions based on the extensions indicated by the client, and TLS server 210-a may respond with a server hello message (e.g., a server-side security parameter message) indicating the selected cipher or cipher suite, TLS protocol version, and set of extensions. The server hello message may indicate that the server supports TLS. In this way, the client and server may negotiate security parameters for implementing the TLS protocol. Additionally or alternatively, the client and server may perform cryptographic negotiation to identify ciphers, exchange keys, or other cryptographic information.

In some examples, to support active fingerprinting of TLS servers 210, the device 205 may leverage the hello messages to analyze the TLS configurations of the TLS servers 210. For example, rather than transmit a single client hello message, the device 205 may transmit a set of client hello messages 215. Each client hello message of the set of client hello messages 215 may include a specific ordering of cipher suites in the cipher suite list, a specific ordering of extensions in the set of extensions, or both. The ordering of the cipher suites, extensions, or both may generally correspond to an order of preference for the client. Additionally or alternatively, each client hello message may include a specific set of cipher suites in the cipher suite list, a specific TLS protocol version, a specific set of extensions, or some combination of these or other information included in the client hello messages. Such a set of client hello messages 215 may act as a set of control clients (e.g., a control set of TLS Client Hello messages to query servers) in order to elicit a controlled set of results across different TLS servers 210.

The device 205 may transmit a first client hello message to a TLS server 210 (e.g., TLS server 210-*a*) and may receive a first server hello message in response. The device 205 may analyze how TLS server 210-*a* responds to the specific ordering of the cipher suites, extensions, or both in the first client hello message. The device 205 may further transmit a second client hello message to TLS server 210-*a* with different parameters (e.g., a different ordering of the cipher suites, extensions, or both; a different set of cipher suites, a different TLS protocol version, a different set of extensions, or some combination thereof) and may analyze how TLS server 210-*a* responds to the second client hello message. In this way, the device 205 may analyze how TLS server 210-*a* responds to a standard set of client hello messages 215 with specifically selected and ordered cipher suite lists, TLS protocol versions, sets of extensions, or some combination thereof.

The device 205 may send the set of client hello messages 215 to TLS server 210-*a* and may receive a set of server hello messages 220-*a* in response. In some cases, the client hello messages 215 may be referred to as client-side security parameter messages and the server hello messages 220 may be referred to as server-side security parameter messages. A client hello message may be a TLS Client Hello message and a server hello message may be a TLS Server Hello message. In some cases, after receiving the set of server hello messages 220 from a TLS server 210 in response to the set of client hello messages 215, the device 205 may close the connection with the TLS server 210 (e.g., with a FIN command) so as to not leave the sockets open.

In some cases, there may be a one-to-one correlation between the set of client hello messages 215 and the set of server hello messages 220. In some examples, for each client hello message received by TLS server 210-*a*, TLS server 210-*a* may respond with a corresponding server hello message, a handshake failure alert, or no response based on the contents of the client hello message (e.g., the cipher suite list, the ordering of the cipher suites, the TLS protocol version, the set of extensions, the ordering of the extensions in the set, or any combination thereof). The results of each scan (e.g., the response to each client hello message) may provide information about the TLS server's configuration. For example, if a server hello message is received, the cipher or cipher suite, TLS protocol version, and/or set of extensions indicated by the server hello message may indicate information about the TLS configuration for that server. Furthermore, not receiving a response or receiving a handshake failure alert may also indicate information about the TLS configuration for that server.

Each TLS server 210 may determine the contents for a server hello message based on the contents of a client hello message and the TLS configuration of the TLS server 210. That is, two servers with the same TLS configuration will respond in the same way to the same client hello message. Accordingly, if the same set of client hello messages 215 is sent to multiple different servers implementing the same TLS configuration, each of the servers will respond with the same set of server hello messages 220. However, if two servers with different TLS configurations receive the same set of client hello messages 215, the two servers may respond differently based on the different TLS configurations.

A TLS server 210 may perform selections to determine the contents for a server hello message. The selections may be based on the cipher suites indicated by a client hello message, the order of the cipher suite list, the TLS protocol version indicated by the client hello message, the set of extensions indicated by the client hello message, the order of the indicated set of extensions, an operating system (OS) of the server, a version of the OS, a list of installed packages at the server, a list of libraries that are called by the server, versions of the libraries, the order in which the libraries are called, a configuration of the server, or any combination thereof. For example, the TLS server 210 may select a cipher or cipher suite, a TLS protocol version to use, one or more extensions to use, one or more preferences, or any combination thereof based on any combination of the parameters described herein.

The device 205 may combine the results of the active fingerprinting (e.g., the received set of server hello messages 220) into a hash 225. For example, the device 205 may create hash 225-*a* (e.g., generate a hash value) for TLS server 210-*a* using the set of server hello messages 220-*a*. By generating hashes 225, the device 205 may generate a specific fingerprint for TLS servers 210 based on sending the specific set of client hello messages 215. Hash 225-*a* may indicate information about the TLS configuration of TLS server 210-*a*, for example, when compared to hashes 225 for other TLS servers 210.

For example, the device 205 may repeat the process across a set of TLS servers 210. The device 205 may query TLS server 210-*b* using the same set of client hello messages 215 and may receive a set of server hello messages 220-*b* in response from TLS server 210-*b*. The device 205 may create hash 225-*b* based on the received set of server hello messages 220-*b* from TLS server 210-*b*. Because servers with the same TLS configuration will respond to a client hello message in the same manner, different hashes 225 generated for different TLS servers 210 (e.g., generated in response to the same set of client hello messages 215) may indicate that the servers are implementing different TLS configurations. Alternatively, if the TLS servers 210 have the same hash 225, it is probable that the TLS servers 210 are implementing the same TLS configuration. Increasing the size and diversity of the set of client hello messages 215 may increase the probability that TLS servers 210 with the same hash value are implementing the same TLS configuration. As an example, the device 205 may use a set of ten different client hello messages to ensure reliable results (e.g., above a reliability threshold for determining a same TLS configuration between servers).

Figure 3:
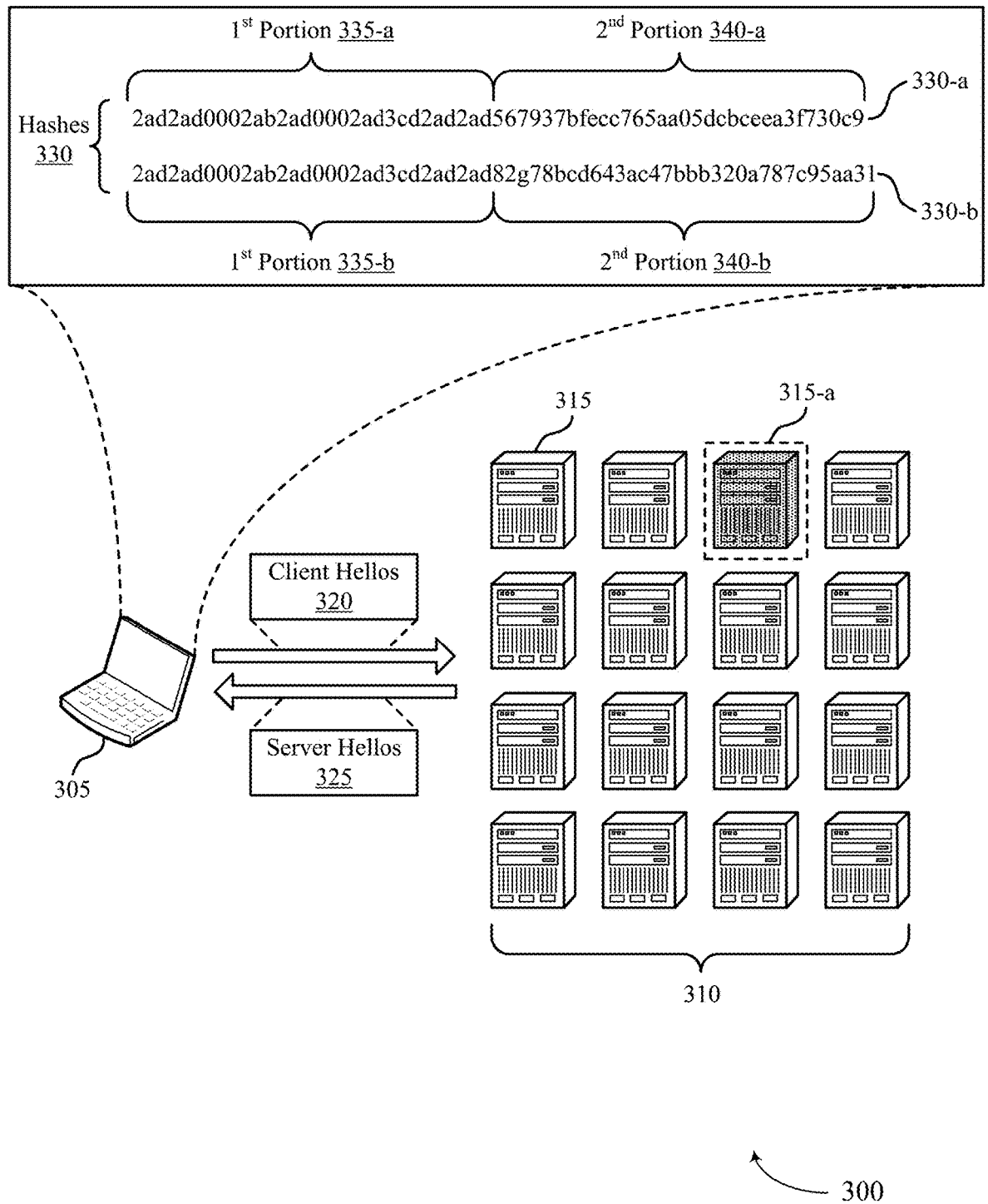

FIG. 3 illustrates an example of a fingerprinting process 300 that supports active fingerprinting for TLS servers in accordance with aspects of the present disclosure. The fingerprinting process 300 may be an example of a fingerprinting process 200 as described with reference to FIG. 2. A device 305, which may be an example of a device 205 as described with reference to FIG. 2, may actively fingerprint a set of servers 310. The set of servers 310 may include any number of TLS servers 315, which may be examples of TLS servers 210 as described with reference to FIG. 2. Based on the active fingerprinting procedure, the device 305 may generate hashes 330 for the set of servers 310. Differences between the hashes 330 generated for different TLS servers 315 may indicate differences in the TLS configurations of the servers. In this way, the device 305 may determine if a host/server on a network or the Internet is similar to another host/server.

As described with reference to FIG. 2, the device 305 may transmit the same set of client hello messages 320 to each TLS server 315 of the set of servers 310. The device 305 may receive a set of server hello messages 325 in response. TLS servers 315 configured with the same TLS configuration may responds with the same set of server hello messages 325, while TLS servers 315 configured with different TLS configurations may potentially respond with different sets of server hello messages 325. For example, as illustrated in FIG. 3, TLS server 315-*a* may respond with a different set of server hello messages 325 than the other TLS servers 315 of the set of servers 310 in response to the same set of client hello messages 320.

The device 305 may generate a hash 330 corresponding to a TLS server 315 based on the set of server hello messages 325 received from that TLS server 315. Because the value of the hash 330 is determined based on the server hello messages 325, two TLS servers 315 that respond with the same set of server hello messages 325 will correspond to the same hash value. Similarly, two TLS servers 315 that respond with different sets of server hello messages 325 will correspond to different hash values.

In some examples, the hash 330 may be referred to as a JARM hash. In some cases, the JARM hash may be an example of or include a fuzzy hash. For example, different portions of the JARM hash may indicate different information. As illustrated, a first portion 335 of the hash 330 may indicate information associated with the cipher suites and TLS protocol versions indicated by the set of server hello messages 325, while a second portion 340 of the hash 330 may indicate information associated with the sets of extensions indicated by the set of server hello messages 325. In some cases, one or more portions of the hash 330 may be composed of sub-hashes (e.g., an independent hash that is aggregated with other information to form a larger hash). For example, the second portion 340 of the hash 330 may be a truncated SHA256 hash based on the sets of extensions indicated by the set of server hello messages 325. Such a sub-hash may be generated independent of the hash 330 and may also be referred to simply as a hash or hash value. In some cases, additional or alternative structures for the hashes 330 may be supported.

Portions of different hashes 330 may be compared to indicate information about the TLS configurations of the corresponding TLS servers 315. For example, if the first portions 335 of different hashes 330 are different, the corresponding TLS servers 315 select different cipher suites, TLS protocol versions, or both in response to the same set of client hello messages 320. If the second portions 340 of different hashes 330 are different, the corresponding TLS servers 315 select different sets of extensions in response to the same set of client hello messages 320. For example, as illustrated, the first portion 335-*a* of a first hash 330-*a* and the first portion 335-*b* of a second hash 330-*b* may be the same. This may indicate that the corresponding TLS servers 315 select the same cipher suites and TLS protocol versions in response to the standard set of client hello messages 320. However, the second portion 340-*a* of the first hash 330-*a* and the second portion 340-*b* of the second hash 330-*b* may be different, indicating that the corresponding TLS servers 315 select different extensions in response to the standard set of client hello messages 320.

In one specific example, the device 305 may send a standard set of ten client hello messages 320 to each server 315 of the set of servers 310. The device 305 may generate the first portion 335 of the hash 330 using 3 bytes per client hello message. For example, each server hello message received in response to a client hello message may contribute 3 bytes to a fuzzy hash for the first portion 335. In some cases, a server hello message may include a cipher (e.g., a cipher suite) selected from 69 possible ciphers and a version (e.g., a TLS protocol version) selected from 4 possible versions. The 69 ciphers may be listed in a particular order in the underlying code based on cipher strength and hexadecimal value. The first 2 bytes of each 3-byte set in the fuzzy hash may correspond to the cipher's numerical position in the list in hexadecimal. Thus, the first 2 bytes of each 3-byte set may range from "01" to "45" in hexadecimal form. If no cipher is returned, the first 2 bytes may be set to "00." The third byte of each 3-byte set may correspond to the version. Like the ciphers, the versions may be ordered numerically. The version's position in the list may result in a letter from "a" to "d" being selected, with "a" corresponding to a selection of the first version and "d" corresponding to a selection of the fourth version. In some cases, if additional versions are supported, the third byte may range from "a" to "f," or some other range. If no version is returned, the third byte may be set to "0." This process may be repeated 10 times (e.g., in response to the ten client hello messages 320), resulting in a 30-byte fuzzy hash for the first portion 335 of the JARM hash.

The device 305 may generate the second portion 340 of the hash 330 using a hashing algorithm (e.g., truncated SHA256 or another hashing algorithm). Each server hello message may potentially return a set of extensions (e.g., an application layer negotiation protocol and other protocols or extensions). The device 305 may collect and concatenate the application layer negotiation protocols and extensions from the received set of server hello messages 325 into a single String. In some examples, the device 305 may separate each extension with a hyphen. The device 305 may encode and hash the String into a 32-byte hash. The device 305 may append this 32-byte hash to the end of the 30-byte fuzzy hash to create the hash 330 (e.g., the JARM hash). If no server hello messages 325 are received from a TLS server 315 in response to the set of client hello messages 320, the device 305 may create a hash 330 of all zeroes (e.g., 62 "0"s, without performing any hashing, such as fuzzy hashing or truncated SHA256 hashing).

As an example, the device 305 may receive a server hello message indicating cipher "c030," version "0303," application layer negotiation protocol "h2," and extensions "ff01," "0000," "0001," "000b," "0023," and "0010." The device 305 may determine the 3-byte set corresponding to this server hello message for the first portion 335 of the hash 330. For example, the device 305 may identify the cipher "c030" as the 42nd cipher in the cipher list, so the first 2 bytes may be set to the hexadecimal value of 42, "2a." The device 305 may identify that version "0303" is the fourth version in the version list, so the third byte may be set to "d." The device 305 may additionally determine the 3-byte sets for the other server hello messages 325. For the second portion 340 of the hash 330, the device 305 may concatenate the application layer negotiation protocol and the extensions as "h2ff01-0000-0001-000b-0023-0010," along with any other protocols and/or extensions from the other server hello messages 325. The device 305 may hash the full String to determine a 32-byte hash for the second portion 340 of the hash 330. It is to be understood that other hashing techniques may be implemented to support the processes described herein.

As illustrated, the device 305 may determine a first hash 330-*a* for the majority of the TLS servers 315 of the set of servers 310 and may determine a second hash 330-*b* for server 315-*a* of the set of servers 310. In this way, the device 305 may determine that server 315-*a* is configured with a different TLS configuration than the other TLS servers 315 in the set of servers 310. In some cases, a user may take an action based on such a determination. For example, if the TLS configuration of server 315-*a* is out-of-date, the user may patch the TLS configuration of server 315-*a* to comply with the other TLS servers 315. Alternatively, if TLS server 315-*a* is the gold standard for configuration in a fleet of servers (e.g., the set of servers 310), the other TLS servers 315 in the fleet may be updated to run the same configuration as TLS server 315-*a*.

In some examples, the device 305 may use the hashes 330 to detect TLS servers 315 associated with malware on the Internet. For example, if the device 305 determines a first TLS server 315-*a* (e.g., a host at 1.2.3.4) is associated with malware, the device 305 may search for other TLS servers 315 with the same configuration as the TLS server 315-*a* associated with the malware. Other TLS servers 315 with the same TLS configuration (e.g., a matching hash 330) may be likely to be associated with the same malware. For example, the device 305 may determine if the host at 1.2.3.5 is also related to the same malware. Accordingly, the device 305 may use the active fingerprinting techniques to identify malicious servers on the Internet (e.g., based on the server configurations and potentially prior to specific attacks by the malicious servers on a client's network) and can apply techniques to mitigate attacks by such malicious servers. For example, adversarial servers and other malicious infrastructure can be proactively identified and blocked using the active fingerprinting techniques described herein, potentially preventing threats before an attack is launched.

Specifically, malware command-and-control servers—among other malicious servers—may be configured similar to other servers and deployed across a fleet. Based on the configuration of these servers, a malicious server may often correspond to a different hash 330 than non-malicious servers. Therefore, to identify a set of malicious servers, a device 305 or set of devices may scan the Internet using active fingerprinting techniques to determine hashes 330 for a number of servers. A device 305 may use the hash 330 for a server known to be associated with malware for comparison with the hashes 330 resulting from the scan. The device 305 may determine servers resulting in the same hash 330 as a malicious server, and the device 305 may identify such servers as potentially also being malicious.

In some cases, the identified set of potentially malicious servers may include one or more false positives (e.g., servers with a same hash 330 as a malicious server that are not malicious). The device 305 may filter out the false positives to determine a set of malicious servers. For example, the device 305 may use a server's history (e.g., Internet historical data) to determine whether the server is likely a legitimate server or a malicious server. The device 305 may determine whether to classify a server as a false positive based on a length of time for which the server's attributes have remained unchanged, the server's name, a hosting provider for the server, a certificate authority for the server, or any combination of these or other server information. The device 305 may remove the false positives from the identified set of potentially malicious servers.

The device 305 may generate a blocklist (e.g., a proactive blocklist) for the determined set of malicious servers (e.g., with the false positives removed). Such a process may support programmatically building out high fidelity blocklists prior to malware being distributed, proactively identifying and blocking malicious servers on the Internet. This may improve upon systems that observe and analyze malware distribution in order to generate blocklists, because proactively identifying malicious servers prior to malware distribution may improve system security (e.g., by reducing the latency involved in the identification and reducing the resources involved in tracking and mitigating the distributed malware).

In some cases, a client may use the active fingerprinting techniques described herein for detection and response by automatically scanning destination hosts observed on a network and comparing the resulting hashes 330 to a list of hashes 330 (e.g., a blocklist or other list of untrusted servers). In some cases, a device 305 may generate a hash 330 for distribution to other devices. For example, the device 305 may determine a list of hashes 330 associated with servers known to be associated with malware. The device 305 may provide the list of hashes 330 to a client. Additionally, the device 305 may indicate the set of client hello messages 320 used to generate the hashes 330 to the client. The client may use the same set of client hello messages 320 to scan a single server or multiple servers. For example, the client may scan a server and compare the resulting hash 330 to the list of hashes 330. If the list includes the resulting hash 330, the client may determine that the scanned server is likely to be associated with malware and may take appropriate actions based on this determination.

Figure 4:
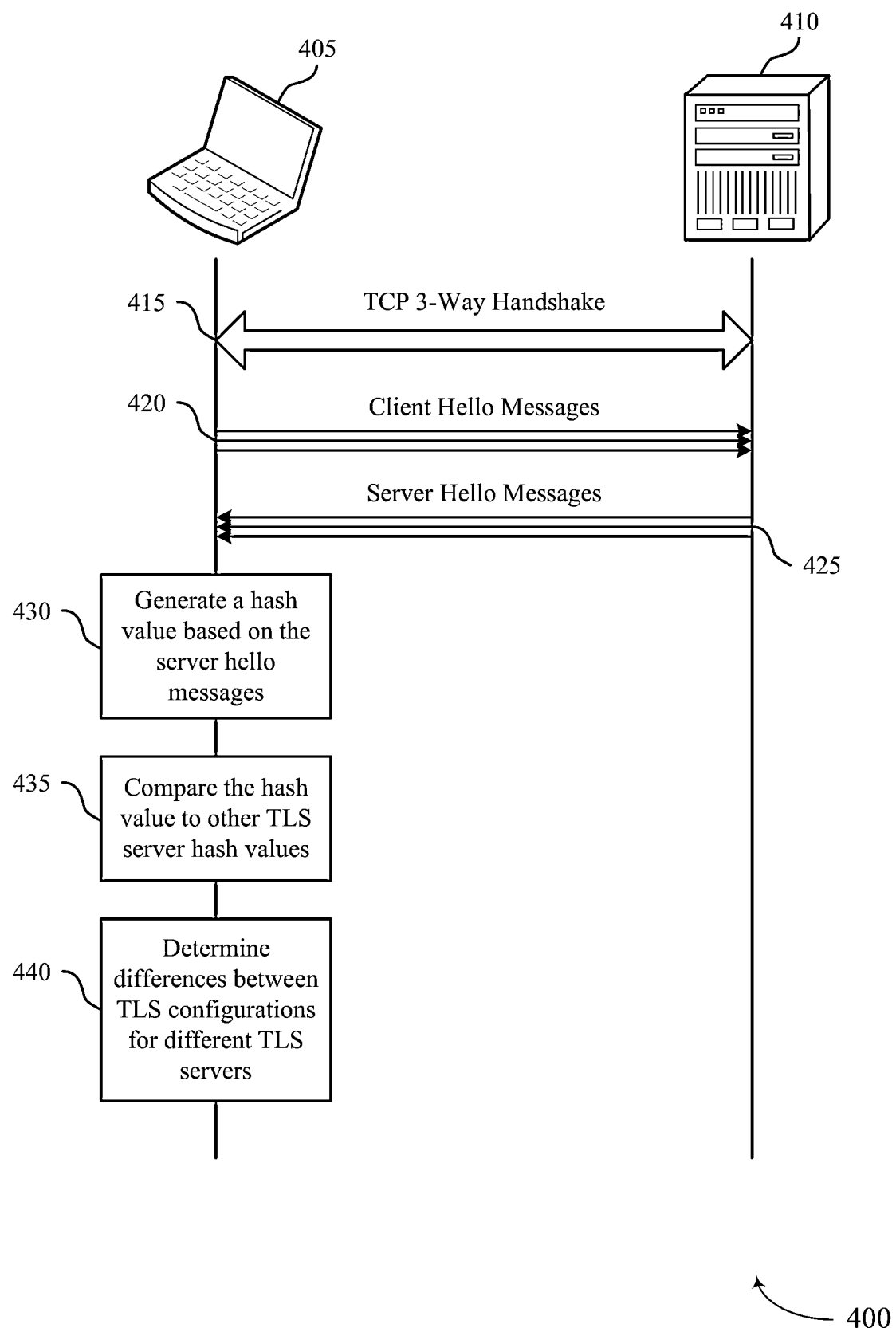
FIG. 4 illustrates an example of a process flow that supports active fingerprinting for TLS servers in accordance with aspects of the present disclosure.

FIG. 4 illustrates an example of a process flow 400 that supports active fingerprinting for TLS servers in accordance with aspects of the present disclosure. The process flow 400 may support a fingerprinting process 200 or 300 as described with reference to FIGS. 2 and 3. For example, a device 405 may identify, through simple, unauthenticated scanning, if one TLS server 410 is like another by sending specially crafted packets (e.g., client-side security parameter messages) and fingerprinting the response(s). The device 405 may use the fingerprinting to categorize each TLS server 410 of a set of servers on the Internet. Alternative examples of the following may be implemented, where some steps are performed in a different order than described or are not performed at all. In some cases, steps may include additional features not mentioned below, or further steps may be added.

In some cases, at 415, the device 405 and the TLS server 410 may perform a TCP 3-way handshake. At 420, the device 405 may transmit, to the TLS server 410, a set of client-side security parameter messages. The device 405 may transmit the same set of client-side security parameter messages to each TLS server 410 for active fingerprinting. The set of client-side security parameter messages may be examples of client hello messages, such as TLS Client Hello messages. For example, the set may include ten different TLS Client Hello messages. Each client-side security parameter message may indicate a cipher suite list for a client, a TLS protocol version for the client, a set of extensions for the client, or a combination thereof.

At 425, the device 405 may receive, in response to the set of client-side security parameter messages, a set of server-side security parameter messages from the TLS server 410. The device 405 may receive the same or different sets of server-side security parameter messages from different TLS servers in response to the same set of client-side security parameter messages. The set of server-side security parameter messages may be examples of server hello messages, such as TLS Server Hello messages. Each server-side security parameter message may indicate a cipher or cipher suite selected by the TLS server 410, a TLS protocol version selected by the TLS server 410, a set of extensions selected by the TLS server 410, or a combination thereof. In some cases, the device 405 may receive no response or a handshake failure alert in response to one or more client-side security parameter messages.

At 430, the device 405 may generate a hash value (e.g., a JARM hash) corresponding to the TLS server 410 based on the set of server-side security parameter messages received from the TLS server 410. In some examples, a first portion of the hash value may indicate the cipher or cipher suite selected by the TLS server and the TLS protocol version selected by the TLS server for each of the set of server-side security parameter messages, and a second portion of the hash value may include a sub-hash (e.g., an MD5 hash, a truncated SHA256 hash, or another hash value) based on the set of extensions selected by the TLS server for each of the set of server-side security parameter messages.

At 435, the device 405 may compare the hash value for the TLS server 410 to hash values generated for other TLS servers. At 440, the device 405 may determine whether a TLS configuration for the TLS server 410 is different from a TLS configuration for another TLS server based on the comparison of the hash value for the TLS server 410 with a hash value for the other TLS server. In some examples, the device 405 may compare the first portion of the first hash value with the first portion of the second hash value to determine whether the TLS configurations for the TLS servers support different procedures for selecting ciphers or cipher suites, selecting TLS protocol versions, or both. Additionally or alternatively, the device 405 may compare the second portion of the first hash value with the second portion of the second hash value to determine whether the TLS configurations for the TLS servers support different procedures for selecting sets of extensions. Using such techniques, the device 405 may identify TLS server application information for the TLS server 410.

In some cases, the device 405 may send the hash value for display in a user interface of the device 405 or of another user device. In some cases, the device 405 may use the hash values to determine TLS servers associated with malware, associated with out-of-date configurations, or the like.

Figure 5:
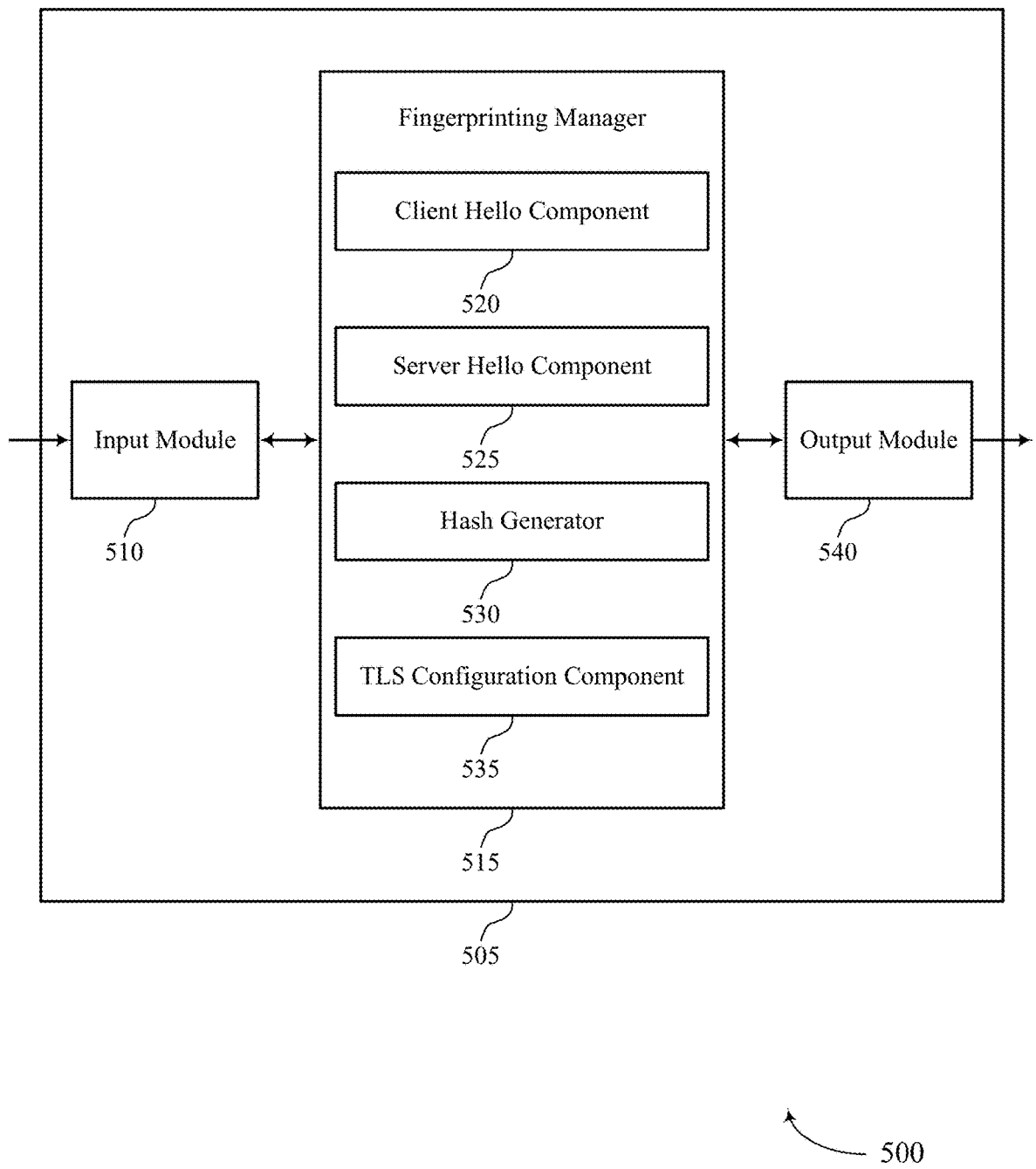
FIG. 5 shows a block diagram of an apparatus that supports active fingerprinting for TLS servers in accordance with aspects of the present disclosure.

FIG. 5 shows a block diagram 500 of an apparatus 505 that supports active fingerprinting for TLS servers in accordance with aspects of the present disclosure. The apparatus 505 may include an input module 510, a fingerprinting manager 515, and an output module 540. The apparatus 505 may also include a processor. Each of these components may be in communication with one another (e.g., via one or more buses). In some cases, the apparatus 505 may be an example of a user terminal, a server, or a system containing multiple computing devices. For example, the apparatus 505 may be an example or component of a client device supporting a client application.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the fingerprinting manager 515 to support active fingerprinting for TLS servers. In some cases, the input module 510 may be a component of an input/output (I/O) controller 715 as described with reference to FIG. 7.

The fingerprinting manager 515 may include a client hello component 520, a server hello component 525, a hash generator 530, and a TLS configuration component 535. The fingerprinting manager 515 may be an example of aspects of the fingerprinting manager 605 or 710 described with reference to FIGS. 6 and 7.

The fingerprinting manager 515 and/or at least some of its various sub-components may be implemented in hardware, software executed by a processor, firmware, or any combination thereof. If implemented in software executed by a processor, the functions of the fingerprinting manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The fingerprinting manager 515 and/or at least some of its various sub-components may be physically located at various positions, including being distributed such that portions of functions are implemented at different physical locations by one or more physical devices. In some examples, the fingerprinting manager 515 and/or at least some of its various sub-components may be a separate and distinct component in accordance with various aspects of the present disclosure. In other examples, the fingerprinting manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The client hello component 520 may transmit, to a first TLS server and a second TLS server, a same set of client-side security parameter messages (e.g., client hello messages), each client-side security parameter message of the set of client-side security parameter messages indicating a cipher suite list for a client, a TLS protocol version for the client, a set of extensions for the client, or a combination thereof.

The server hello component 525 may receive, in response to the set of client-side security parameter messages, a first set of server-side security parameter messages (e.g., server hello messages) from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof.

The hash generator 530 may generate a first hash value corresponding to the first TLS server based on the first set of server-side security parameter messages and a second hash value corresponding to the second TLS server based on the second set of server-side security parameter messages. The TLS configuration component 535 may determine whether a first TLS configuration for the first TLS server is different from a second TLS configuration for the second TLS server based on a comparison of the first hash value and the second hash value.

The output module 540 may manage output signals for the apparatus 505. For example, the output module 540 may receive signals from other components of the apparatus 505, such as the fingerprinting manager 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
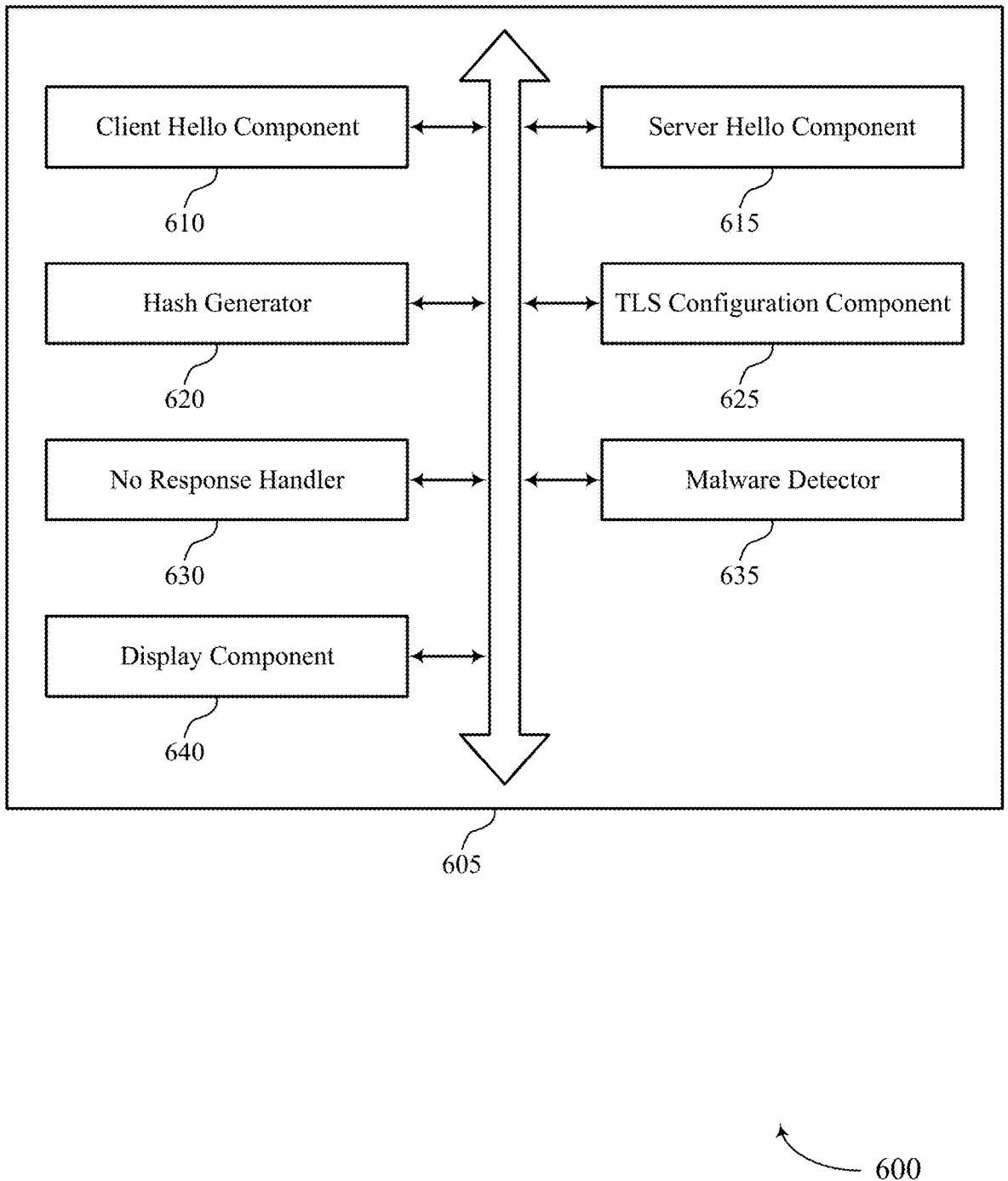
FIG. 6 shows a block diagram of a fingerprinting manager that supports active fingerprinting for TLS servers in accordance with aspects of the present disclosure.

FIG. 6 shows a block diagram 600 of a fingerprinting manager 605 that supports active fingerprinting for TLS servers in accordance with aspects of the present disclosure. The fingerprinting manager 605 may be an example of aspects of a fingerprinting manager 515 or a fingerprinting manager 710 described herein. The fingerprinting manager 605 may include a client hello component 610, a server hello component 615, a hash generator 620, a TLS configuration component 625, a no response handler 630, a malware detector 635, a display component 640, or any combination of these or other components. Each of these components may communicate, directly or indirectly, with one another (e.g., via one or more buses).

The client hello component 610 may transmit, to a first TLS server and a second TLS server, a same set of client-side security parameter messages, each client-side security parameter message of the set of client-side security parameter messages indicating a cipher suite list for a client, a TLS protocol version for the client, a set of extensions for the client, or a combination thereof. In some cases, a client-side security parameter message may be an example of a TLS Client Hello message.

The server hello component 615 may receive, in response to the set of client-side security parameter messages, a first set of server-side security parameter messages from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof. In some cases, a server-side security parameter message may be an example of a TLS Server Hello message.

The hash generator 620 may generate a first hash value corresponding to the first TLS server based on the first set of server-side security parameter messages and a second hash value corresponding to the second TLS server based on the second set of server-side security parameter messages. The TLS configuration component 625 may determine whether a first TLS configuration for the first TLS server is different from a second TLS configuration for the second TLS server based on a comparison of the first hash value and the second hash value.

In some examples, a first portion of the first hash value indicates the cipher suite selected by the TLS server and the TLS protocol version selected by the TLS server for each of the first set of server-side security parameter messages. In some such examples, a second portion of the first hash value includes a third hash value generated based on the set of extensions selected by the TLS server for each of the first set of server-side security parameter messages. In some cases, the third hash value includes a truncated SHA256 hash. In some examples, the TLS configuration component 625 may compare the first portion of the first hash value to a first portion of the second hash value to determine whether the first TLS configuration for the first TLS server and the second TLS configuration for the second TLS server include different procedures for selecting the cipher suite, the TLS protocol version, or both. Additionally or alternatively, in some examples, the TLS configuration component 625 may compare the second portion of the first hash value to a second portion of the second hash value to determine whether the first TLS configuration for the first TLS server and the second TLS configuration for the second TLS server include different procedures for selecting the set of extensions.

In some examples, the no response handler 630 may receive, in response to a first client-side security parameter message of the set of client-side security parameter messages, a handshake failure alert or no response from the first TLS server. In some such examples, generating the first hash value may involve the no response handler 630 inputting, into the first hash value, a set of zeroes corresponding to a response to the first client-side security parameter message based on receiving the handshake failure alert or no response from the first TLS server.

In some examples, the client hello component 610 may transmit, to a third TLS server, the same set of client-side security parameter messages. In some such examples, the no response handler 630 may receive a handshake failure alert or no response from the third TLS server in response to each client-side security parameter message of the set of client-side security parameter messages, and the no response handler 630 may generate a third hash value corresponding to the third TLS server by setting the third hash value to a set of zeroes based on receiving the handshake failure alert or no response from the third TLS server in response to each client-side security parameter message.

In some examples, receiving the first set of server-side security parameter messages from the first TLS server may involve the server hello component 615 receiving a first server-side security parameter message in response to a first client-side security parameter message, the first client-side security parameter message indicating a first cipher suite list, a first TLS protocol version, and a first set of extensions, and the first server-side security parameter message indicating a second cipher suite selected based on a set of cipher suites in the first cipher suite list, an order of the first cipher suite list, or both, a second TLS protocol version selected based on the first TLS protocol version, and a second set of extensions selected based on the first set of extensions. The second TLS protocol version may be the same as or different from the first TLS protocol version. Similarly, the second set of extensions may be the same as or different from the first set of extensions.

The malware detector 635 may identify that the first TLS server is associated with malware and may determine that the second TLS server is associated with the malware based on determining that the first TLS configuration for the first TLS server is the same as the second TLS configuration for the second TLS server based on the comparison of the first hash value and the second hash value. In some examples, the malware detector 635 may scan a set of TLS servers over an Internet, where the scanning involves generating at least the first hash value for the first TLS server and the second hash value for the second TLS server, determine one or more TLS servers of the set of TLS servers associated with malware based on the scanning, and generate a blocklist indicating the one or more TLS servers associated with the malware.

The display component 640 may send the first hash value and the second hash value for display in a user interface of a user device.

Figure 7:
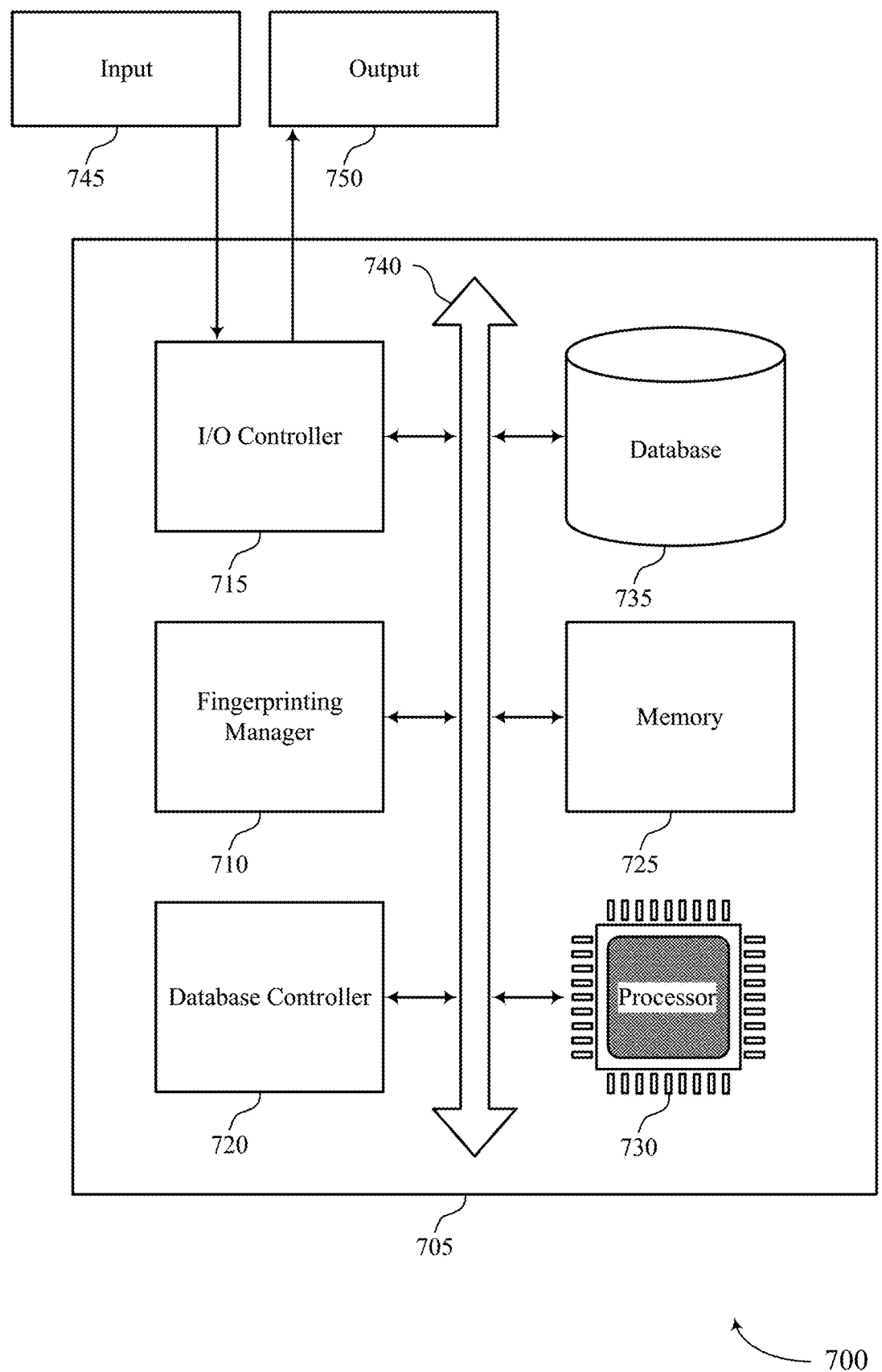
FIG. 7 shows a diagram of a system including a device that supports active fingerprinting for TLS servers in accordance with aspects of the present disclosure.

FIG. 7 shows a diagram of a system 700 including a device 705 that supports active fingerprinting for TLS servers in accordance with aspects of the present disclosure. The device 705 may be an example of or include the components of an application server, a user device, or an apparatus 505 as described herein. For example, the device 705 may be an example of a client device running a client application. The device 705 may include components for bi-directional data communications including components for transmitting and receiving communications, including a fingerprinting manager 710, an I/O controller 715, a database controller 720, memory 725, a processor 730, and a database 735. These components may be in electronic communication via one or more buses (e.g., bus 740).

The fingerprinting manager 710 may be an example of a fingerprinting manager 515 or 605 as described herein. For example, the fingerprinting manager 710 may perform any of the methods or processes described above with reference to FIGS. 5 and 6. In some cases, the fingerprinting manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic I/O system (BIOS) which may control basic hardware or software operation such as the interaction with peripheral components or devices.

The processor 730 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting active fingerprinting for TLS servers).

Figure 8:
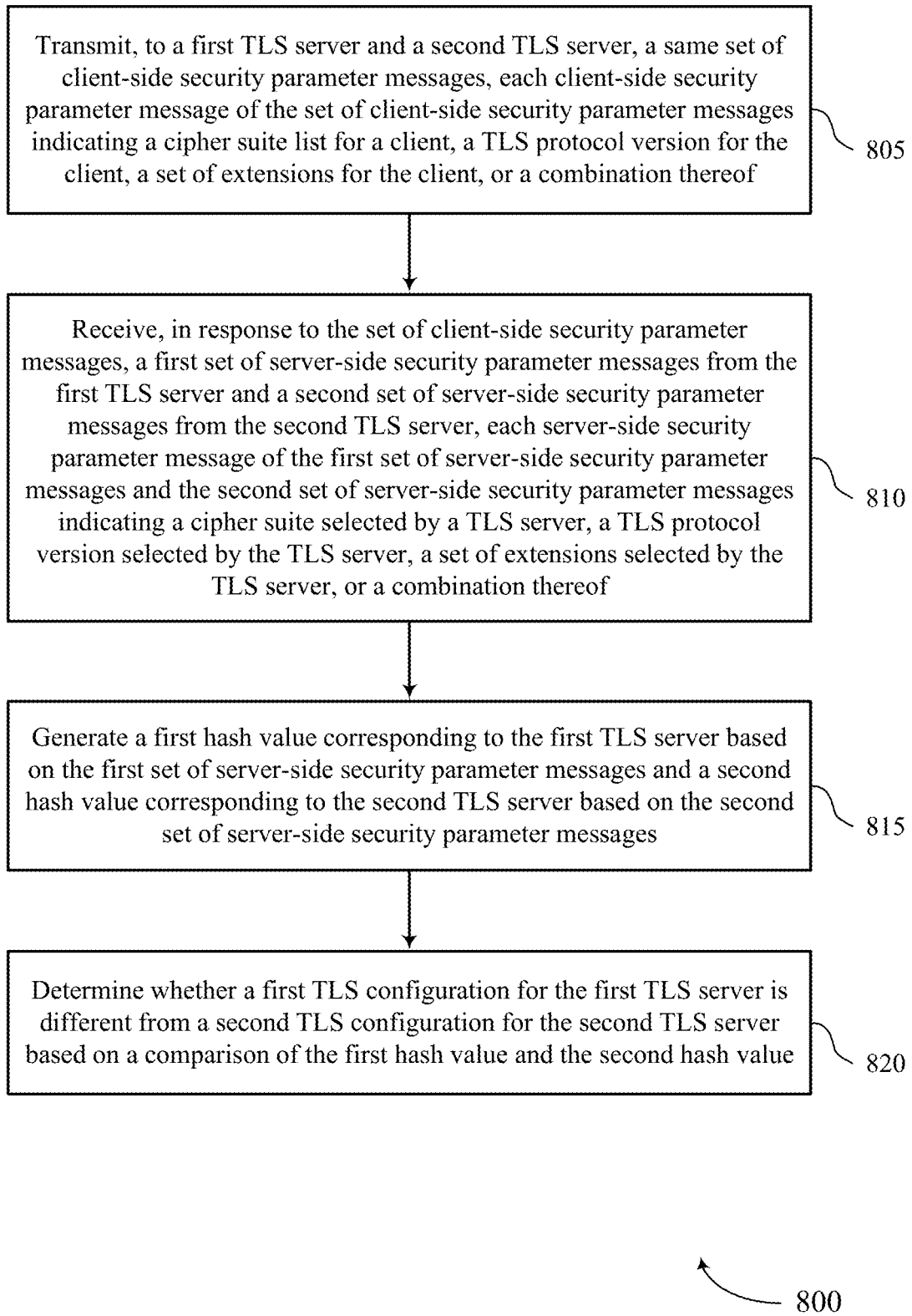
FIGS. 8 and 9 show flowcharts illustrating methods that support active fingerprinting for TLS servers in accordance with aspects of the present disclosure.

FIG. 8 shows a flowchart illustrating a method 800 that supports active fingerprinting for TLS servers in accordance with aspects of the present disclosure. The operations of method 800 may be implemented by a device (e.g., a user device, an application, an application server, a database server, a cloud-based server, a server cluster, a virtual machine, a container, or any other device or system of devices) or its components as described herein. For example, the operations of method 800 may be performed by a fingerprinting manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 805, the device may transmit, to a first TLS server and a second TLS server, a same set of client-side security parameter messages, each client-side security parameter message of the set of client-side security parameter messages indicating a cipher suite list for a client, a TLS protocol version for the client, a set of extensions for the client, or a combination thereof. The operations of 805 may be performed according to the methods described herein. In some examples, aspects of the operations of 805 may be performed by a client hello component as described with reference to FIGS. 5 through 7.

At 810, the device may receive, in response to the set of client-side security parameter messages, a first set of server-side security parameter messages from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof. The operations of 810 may be performed according to the methods described herein. In some examples, aspects of the operations of 810 may be performed by a server hello component as described with reference to FIGS. 5 through 7.

At 815, the device may generate a first hash value corresponding to the first TLS server based on the first set of server-side security parameter messages and a second hash value corresponding to the second TLS server based on the second set of server-side security parameter messages. The operations of 815 may be performed according to the methods described herein. In some examples, aspects of the operations of 815 may be performed by a hash generator as described with reference to FIGS. 5 through 7.

At 820, the device may determine whether a first TLS configuration for the first TLS server is different from a second TLS configuration for the second TLS server based on a comparison of the first hash value and the second hash value. The operations of 820 may be performed according to the methods described herein. In some examples, aspects of the operations of 820 may be performed by a TLS configuration component as described with reference to FIGS. 5 through 7.

Figure 9:
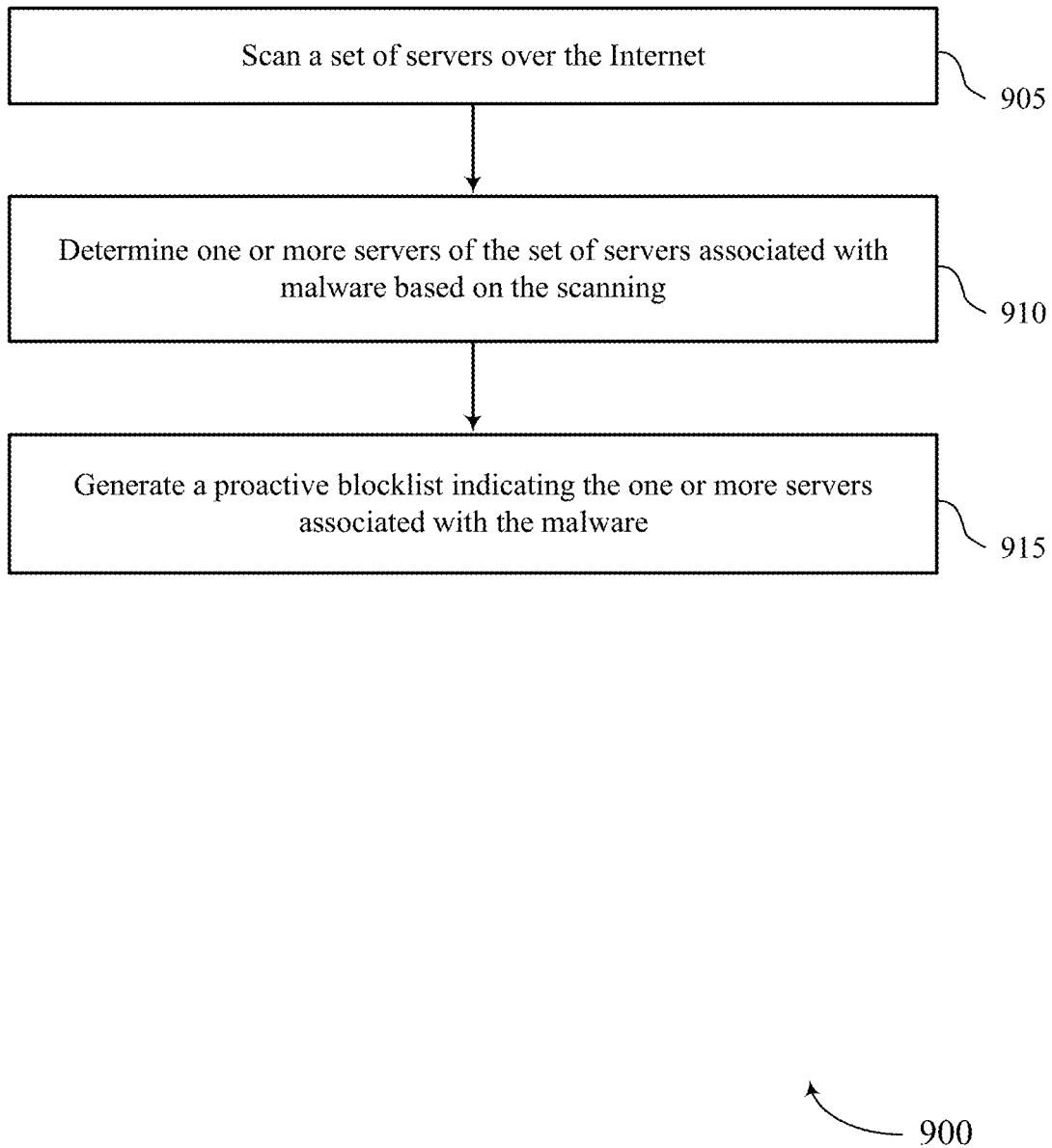

FIG. 9 shows a flowchart illustrating a method 900 that supports active fingerprinting for TLS servers in accordance with aspects of the present disclosure. The operations of method 900 may be implemented by a device (e.g., a user device, an application, an application server, a database server, a cloud-based server, a server cluster, a virtual machine, a container, or any other device or system of devices) or its components as described herein. For example, the operations of method 900 may be performed by a fingerprinting manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 905, the device may scan a set of servers, such as TLS servers, over the Internet. Scanning the servers may involve sending a common set of client-side security parameter messages (e.g., TLS Client Hello messages) to each server of the set of servers and receiving, in response to the common set of client-side security parameter messages, sets of server-side security parameter messages (e.g., TLS Server Hello messages) from the servers. The device may generate a hash value for each server of the set of servers based on the scanning. In this way, the device may monitor the Internet to determine hash values for servers connected to the Internet. The operations of 905 may be performed according to the methods described herein. In some examples, aspects of the operations of 905 may be performed by a malware detector as described with reference to FIGS. 5 through 7.

At 910, the device may determine one or more servers of the set of servers associated with malware based on the scanning. In some cases, the scanning may use a known hash value for a malware command-and-control server or another malicious server and may identify other servers on the Internet with the same hash value. These other servers may include servers that are similarly malicious servers (e.g., servers configured in a similar way or by a similar entity), false positives (e.g., servers that are not malicious but have the same fingerprint as malicious servers), or a combination thereof. The device may determine the false positives (e.g., based on historical information for the servers) and may remove the false positives from the set of identified servers to determine one or more servers associated with malware. The operations of 910 may be performed according to the methods described herein. In some examples, aspects of the operations of 910 may be performed by a malware detector as described with reference to FIGS. 5 through 7.

At 915, the device may generate a blocklist (e.g., a proactive blocklist) indicating the determined one or more servers associated with malware. The blocklist may be used to remove malicious servers, avoid connections with malicious servers, or the like. Proactively generating the blocklist using active fingerprinting may allow the device to detect malicious servers prior to the servers distributing malware to one or more systems, devices, or applications. The operations of 915 may be performed according to the methods described herein. In some examples, aspects of the operations of 915 may be performed by a malware detector as described with reference to FIGS. 5 through 7.

A method for actively fingerprinting TLS servers is described. The method may include transmitting, to a first TLS server and a second TLS server, a same set of client-side security parameter messages, each client-side security parameter message of the set of client-side security parameter messages indicating a cipher suite list for a client, a TLS protocol version for the client, a set of extensions for the client, or a combination thereof, and receiving, in response to the set of client-side security parameter messages, a first set of server-side security parameter messages from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof. The method may further include generating a first hash value corresponding to the first TLS server based on the first set of server-side security parameter messages and a second hash value corresponding to the second TLS server based on the second set of server-side security parameter messages and determining whether a first TLS configuration for the first TLS server is different from a second TLS configuration for the second TLS server based on a comparison of the first hash value and the second hash value.

An apparatus for actively fingerprinting TLS servers is described. The apparatus may include a processor, memory coupled with the processor, and instructions stored in the memory. The instructions may be executable by the processor to cause the apparatus to transmit, to a first TLS server and a second TLS server, a same set of client-side security parameter messages, each client-side security parameter message of the set of client-side security parameter messages indicating a cipher suite list for a client, a TLS protocol version for the client, a set of extensions for the client, or a combination thereof, and receive, in response to the set of client-side security parameter messages, a first set of server-side security parameter messages from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof. The instructions may be further executable by the processor to cause the apparatus to generate a first hash value corresponding to the first TLS server based on the first set of server-side security parameter messages and a second hash value corresponding to the second TLS server based on the second set of server-side security parameter messages and determine whether a first TLS configuration for the first TLS server is different from a second TLS configuration for the second TLS server based on a comparison of the first hash value and the second hash value.

Another apparatus for actively fingerprinting TLS servers is described. The apparatus may include means for transmitting, to a first TLS server and a second TLS server, a same set of client-side security parameter messages, each client-side security parameter message of the set of client-side security parameter messages indicating a cipher suite list for a client, a TLS protocol version for the client, a set of extensions for the client, or a combination thereof, and means for receiving, in response to the set of client-side security parameter messages, a first set of server-side security parameter messages from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof. The apparatus may further include means for generating a first hash value corresponding to the first TLS server based on the first set of server-side security parameter messages and a second hash value corresponding to the second TLS server based on the second set of server-side security parameter messages and means for determining whether a first TLS configuration for the first TLS server is different from a second TLS configuration for the second TLS server based on a comparison of the first hash value and the second hash value.

A non-transitory computer-readable medium storing code for actively fingerprinting TLS servers is described. The code may include instructions executable by a processor to transmit, to a first TLS server and a second TLS server, a same set of client-side security parameter messages, each client-side security parameter message of the set of client-side security parameter messages indicating a cipher suite list for a client, a TLS protocol version for the client, a set of extensions for the client, or a combination thereof, and receive, in response to the set of client-side security parameter messages, a first set of server-side security parameter messages from the first TLS server and a second set of server-side security parameter messages from the second TLS server, each server-side security parameter message of the first set of server-side security parameter messages and the second set of server-side security parameter messages indicating a cipher suite selected by a TLS server, a TLS protocol version selected by the TLS server, a set of extensions selected by the TLS server, or a combination thereof. The code may include further instructions executable by the processor to generate a first hash value corresponding to the first TLS server based on the first set of server-side security parameter messages and a second hash value corresponding to the second TLS server based on the second set of server-side security parameter messages and determine whether a first TLS configuration for the first TLS server is different from a second TLS configuration for the second TLS server based on a comparison of the first hash value and the second hash value.

In some examples of the method, apparatuses, and non-transitory computer-readable medium described herein, a first portion of the first hash value indicates the cipher suite selected by the TLS server and the TLS protocol version selected by the TLS server for each of the first set of server-side security parameter messages, and a second portion of the first hash value includes a third hash value generated based on the set of extensions selected by the TLS server for each of the first set of server-side security parameter messages.

Some examples of the method, apparatuses, and non-transitory computer-readable medium described herein may further include operations, features, means, or instructions for comparing the first portion of the first hash value to a first portion of the second hash value to determine whether the first TLS configuration for the first TLS server and the second TLS configuration for the second TLS server include different procedures for selecting the cipher suite, the TLS protocol version, or both and comparing the second portion of the first hash value to a second portion of the second hash value to determine whether the first TLS configuration for the first TLS server and the second TLS configuration for the second TLS server include different procedures for selecting the set of extensions.

In some examples of the method, apparatuses, and non-transitory computer-readable medium described herein, the third hash value includes a truncated SHA256 hash.

Some examples of the method, apparatuses, and non-transitory computer-readable medium described herein may further include operations, features, means, or instructions for receiving, in response to a first client-side security parameter message of the set of client-side security parameter messages, a handshake failure alert or no response from the first TLS server, where generating the first hash value may further include operations, features, means, or instructions for inputting, into the first hash value, a set of zeroes corresponding to a response to the first client-side security parameter message based on receiving the handshake failure alert or no response from the first TLS server.

Some examples of the method, apparatuses, and non-transitory computer-readable medium described herein may further include operations, features, means, or instructions for transmitting, to a third TLS server, the same set of client-side security parameter messages, receiving a handshake failure alert or no response from the third TLS server in response to each client-side security parameter message of the set of client-side security parameter messages, and generating a third hash value corresponding to the third TLS server by setting the third hash value to a set of zeroes based on receiving the handshake failure alert or no response from the third TLS server in response to each client-side security parameter message.

In some examples of the method, apparatuses, and non-transitory computer-readable medium described herein, receiving the first set of server-side security parameter messages from the first TLS server further may include operations, features, means, or instructions for receiving a first server-side security parameter message in response to a first client-side security parameter message, the first client-side security parameter message indicating a first cipher suite list, a first TLS protocol version, and a first set of extensions, and the first server-side security parameter message indicating a second cipher suite selected based on a set of cipher suites in the first cipher suite list, an order of the first cipher suite list, or both, a second TLS protocol version selected based on the first TLS protocol version, and a second set of extensions selected based on the first set of extensions.

Some examples of the method, apparatuses, and non-transitory computer-readable medium described herein may further include operations, features, means, or instructions for identifying that the first TLS server is associated with malware and determining that the second TLS server is associated with the malware based on determining that the first TLS configuration for the first TLS server is the same as the second TLS configuration for the second TLS server based on the comparison of the first hash value and the second hash value.

Some examples of the method, apparatuses, and non-transitory computer-readable medium described herein may further include operations, features, means, or instructions for scanning a set of TLS servers over an Internet, where the scanning involves generating at least the first hash value for the first TLS server and the second hash value for the second TLS server, determining one or more TLS servers of the set of TLS servers associated with malware based on the scanning, and generating a blocklist indicating the one or more TLS servers associated with the malware.

Some examples of the method, apparatuses, and non-transitory computer-readable medium described herein may further include operations, features, means, or instructions for sending the first hash value and the second hash value for display in a user interface of a user device.

In some examples of the method, apparatuses, and non-transitory computer-readable medium described herein, a client-side security parameter message may be an example of a TLS Client Hello message, and a server-side security parameter message may be an example of a TLS Server Hello message.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for actively fingerprinting servers, comprising:
    transmitting, to a first server and a second server, a same client-side security parameter message indicating one or more parameters for a client;
    receiving, in response to the same client-side security parameter message, a first server-side security parameter message from the first server indicating a first set of parameters selected by the first server and a second server-side security parameter message from the second server indicating a second set of parameters selected by the second server;
    generating a first value corresponding to the first server based at least in part on the first server-side security parameter message and a second value corresponding to the second server based at least in part on the second server-side security parameter message; and
    determining whether a first configuration for the first server is different from a second configuration for the second server based at least in part on a comparison of the first value and the second value.

2. The method of claim 1, further comprising:
    transmitting, to the first server and the second server, a plurality of same client-side security parameter messages, wherein a first same client-side security message of the plurality indicates one or more first parameters for the client and a second same client-side security message of the plurality indicates one or more second parameters for the client different from the one or more first parameters, ordered differently than the one or more first parameters, or both, wherein generating the first value is based at least in part on the plurality of same client-side security parameter messages transmitted to the first server and generating the second value is based at least in part on the plurality of same client-side security parameter messages transmitted to the second server.

3. The method of claim 2, further comprising:
receiving, from the first server and in response to the plurality of same client-side security parameter messages, a plurality of server-side security parameter messages, wherein generating the first value is based at least in part on the plurality of server-side security parameter messages.

4. The method of claim 2, further comprising:
receiving, from the first server, a handshake failure alert in response to at least one client-side security parameter message of the plurality of same client-side security parameter messages, wherein generating the first value is further based at least in part on the handshake failure alert.

5. The method of claim 2, further comprising:
determining that no response is received from the first server in response to at least one client-side security parameter message of the plurality of same client-side security parameter messages, wherein generating the first value is further based at least in part on the no response.

6. The method of claim 1, further comprising:
generating a list of untrusted servers based at least in part on the determining whether the first configuration for the first server is different from the second configuration for the second server; and
blocking communications with one or more servers of the generated list of untrusted servers.

7. The method of claim 1, further comprising:
performing a first transmission control protocol (TCP) three-way handshake procedure with the first server and a second TCP three-way handshake procedure with the second server, wherein transmitting the same client-side security parameter message to the first server and the second server is based at least in part on the first TCP three-way handshake procedure and the second TCP three-way handshake procedure.

8. The method of claim 7, wherein performing the first TCP three-way handshake procedure with the first server comprises:
transmitting, to the first server, a client request message indicating a first synchronization sequence number;
receiving, from the first server and in response to the client request message, a first response message indicating a first acknowledgment of the first synchronization sequence number and a second synchronization sequence number;
transmitting, to the first server and in response to the first response message, a second response message indicating a second acknowledgment of the second synchronization sequence number; and
establishing a connection with the first server based at least in part on the first acknowledgment and the second acknowledgment, wherein the same client-side security parameter message is transmitted to the first server via the connection.

9. The method of claim 1, wherein the determining comprises:
determining that the first configuration for the first server is different from the second configuration for the second server based at least in part on the first value being different from the second value.

10. The method of claim 1, wherein the determining comprises:
determining that the first configuration for the first server and the second configuration for the second server are a same configuration based at least in part on the first value being equal to the second value.

11. The method of claim 1, wherein:
the one or more parameters for the client comprise a cipher suite list for the client;
the first set of parameters selected by the first server comprises a first cipher or a first cipher suite selected from the cipher suite list for the client; and
the second set of parameters selected by the second server comprises a second cipher or a second cipher suite selected from the cipher suite list for the client.

12. The method of claim 1, wherein:
the one or more parameters for the client comprise a protocol version for the client;
the first set of parameters selected by the first server comprises a first protocol version based at least in part on the protocol version for the client; and
the second set of parameters selected by the second server comprises a second protocol version based at least in part on the protocol version for the client.

13. The method of claim 1, wherein:
the one or more parameters for the client comprise a set of extensions for the client;
the first set of parameters selected by the first server comprises one or more first extensions from the set of extensions for the client; and
the second set of parameters selected by the second server comprises one or more second extensions from the set of extensions for the client.

14. The method of claim 1, further comprising:
closing a first connection with the first server, a second connection with the second server, or both based at least in part on receiving the first server-side security parameter message, the second server-side security parameter message, or both.

15. The method of claim 1, wherein:
the first server-side security parameter message indicates the first configuration for the first server; and
the second server-side security parameter message indicates the second configuration for the second server.

16. An apparatus for actively fingerprinting servers, comprising:
one or more processors;
one or more memories coupled with the one or more processors; and
instructions stored in the one or more memories and executable by the one or more processors to cause the apparatus to:
transmit, to a first server and a second server, a same client-side security parameter message indicating one or more parameters for a client;
receive, in response to the same client-side security parameter message, a first server-side security parameter message from the first server indicating a first set of parameters selected by the first server and a second server-side security parameter message from the second server indicating a second set of parameters selected by the second server;

generate a first value corresponding to the first server based at least in part on the first server-side security parameter message and a second value corresponding to the second server based at least in part on the second server-side security parameter message; and determine whether a first configuration for the first server is different from a second configuration for the second server based at least in part on a comparison of the first value and the second value.

17. The apparatus of claim 16, wherein the instructions are further executable by the one or more processors to cause the apparatus to:

transmit, to the first server and the second server, a plurality of same client-side security parameter messages, wherein a first same client-side security message of the plurality indicates one or more first parameters for the client and a second same client-side security message of the plurality indicates one or more second parameters for the client different from the one or more first parameters, ordered differently than the one or more first parameters, or both, wherein generating the first value is based at least in part on the plurality of same client-side security parameter messages transmitted to the first server and generating the second value is based at least in part on the plurality of same client-side security parameter messages transmitted to the second server.

18. The apparatus of claim 16, wherein the instructions are further executable by the one or more processors to cause the apparatus to:

generate a list of untrusted servers based at least in part on the determining whether the first configuration for the first server is different from the second configuration for the second server; and block communications with one or more servers of the generated list of untrusted servers.

19. The apparatus of claim 16, wherein the instructions are further executable by the one or more processors to cause the apparatus to:

perform a first transmission control protocol (TCP) three-way handshake procedure with the first server and a second TCP three-way handshake procedure with the second server, wherein transmitting the same client-side security parameter message to the first server and the second server is based at least in part on the first TCP three-way handshake procedure and the second TCP three-way handshake procedure.

20. A non-transitory computer-readable medium storing code for actively fingerprinting servers, the code comprising instructions executable by one or more processors to:

transmit, to a first server and a second server, a same client-side security parameter message indicating one or more parameters for a client;

receive, in response to the same client-side security parameter message, a first server-side security parameter message from the first server indicating a first set of parameters selected by the first server and a second server-side security parameter message from the second server indicating a second set of parameters selected by the second server;

generate a first value corresponding to the first server based at least in part on the first server-side security parameter message and a second value corresponding to the second server based at least in part on the second server-side security parameter message; and determine whether a first configuration for the first server is different from a second configuration for the second server based at least in part on a comparison of the first value and the second value.

* * * * *